(12) United States Patent
Dupont

(10) Patent No.: US 7,265,677 B2
(45) Date of Patent: Sep. 4, 2007

(54) EXTERNAL DEVICE INDICATING THAT A TANK IS FILLED UP

(76) Inventor: Jean-Luc Dupont, 49, rue du Vivier, F-77230 Longperrier (FR)

( * ) Notice: Subject to any disclaimer, the term of this patent is extended or adjusted under 35 U.S.C. 154(b) by 418 days.

(21) Appl. No.: 10/399,034

(22) PCT Filed: Oct. 18, 2001

(86) PCT No.: PCT/FR01/03230

§ 371 (c)(1),
(2), (4) Date: Apr. 17, 2003

(87) PCT Pub. No.: WO02/33360

PCT Pub. Date: Apr. 25, 2002

(65) Prior Publication Data

US 2005/0099284 A1    May 12, 2005

(51) Int. Cl.
G08B 17/00    (2006.01)

(52) U.S. Cl. ............... 340/623; 340/612; 340/616; 340/618; 340/624; 340/625; 73/290 R; 73/291; 73/340 R; 73/307; 73/308; 73/317; 73/319

(58) Field of Classification Search ........ 340/612, 340/616, 618, 623, 624, 625; 73/290 R, 73/291, 305, 307, 308, 317, 319

See application file for complete search history.

(56) References Cited

U.S. PATENT DOCUMENTS 2,680,169 A    6/1954   Capuano
4,392,128 A *  7/1983   Young et al. ............... 340/616
4,569,312 A *  2/1986   Riddell et al. ........... 122/504.2
6,040,776 A    3/2000   Glover et al.

FOREIGN PATENT DOCUMENTS

| DE | 3235982 |   | 2/1983 |
| DE | 3235982 A1 | * | 2/1983 |
| EP | 0738881 |   | 10/1996 |
| GB | 2339909 |   | 2/2000 |

* cited by examiner

Primary Examiner—Julie Bichngoc Lieu
(74) Attorney, Agent, or Firm—Greenblum & Bernstein, P.L.C.

(57) ABSTRACT

System for indicating when a tank is full. The system includes a signal and control box. A container is connected to the tank. The container has a base, a float, an upper portion, and a lower portion. An orifice is arranged at the upper portion of the container. The float has an electrical contact connected to the signal and control box. The base of the container is arranged one of above a maximum filling level of the tank and substantially at the same level as the maximum filling level of the tank. A communication conduit is connected to each of the base of the container and an area of the tank which is in proximity to an upper portion of the tank. The system generates at least one warning signal after the tank is completely filled and when the container is partially filled by the communication conduit. This Abstract is not intended to define the invention disclosed in the specification, nor intended to limit the scope of the invention in any way.

2 Claims, 2 Drawing Sheets

EXTERNAL DEVICE INDICATING THAT A TANK IS FILLED UP

CROSS-REFERENCE TO RELATED APPLICATIONS

The present application is a National Stage Application of International Patent Application No. PCT/FR01/03230 filed Oct. 18, 2001 which published as WO 02/033360 on Apr. 25, 2002, and claims priority of French Patent Application No. 00/13358 filed Oct. 19, 2000.

BACKGROUND OF THE INVENTION

1. Field of the Invention

The invention relates to an external device indicating that a tank is filled up, in particular, but not exclusively, a fuel tank for boats.

2. Discussion of Background Information

A fuel tank for boats comprises an air intake conduit that is additionally used as an overflow indicator, the user usually being warned of a full tank through a discharge of the fuel in the water, through said conduit.

This process gives rise to many drawbacks, particularly water pollution, a soiling of the boat, vapors originating from the fuel and the waste of the latter.

A similar drawback is found in fuel oil tanks for boilers. In this case, the risks of pollution are on the inside or on the outside of the buildings where said tanks are located.

The position and structure of the fuel tank in a boat, or of a tank for a boiler, as well as the filling methods, do not allow providing a tank of the type of a motor vehicle with a check valve incorporated into the filling pump and activated by the backflow of fuel, the degassing occurring through the filling tube itself.

Systems that are rather complex have nonetheless been envisioned which, in addition to being expensive, have the drawback that it is difficult, even impossible, to adapt such systems to existing tanks.

That is why the Inventor has researched and designed a simple and easily adaptable device that allows avoiding the aforementioned drawbacks.

An apparatus for warning of a tank overflow is already known from the document GB-2 339 909 A, in this case, a WC cistern, said apparatus comprising a housing that is connected to said cistern and that is provided at its upper part with an inlet, and at its lower part with a float. This known apparatus is adapted for a specific use that requires a certain positioning and that necessitates an emptying with each operation.

SUMMARY OF THE INVENTION

On the contrary, the device according to the invention that comprises, as in the aforementioned device, a container that is connected to the tank and that is provided at its upper portion with a vent, and at its lower portion with a float, and is characterized in that the bottom of said container is arranged above, or substantially at the same level as, the maximum filling level of the tank. The container is connected at its base to the vicinity of the upper portion of the tank by way of a communication conduit, while the float has an electrical contact connected to a signal and control box arranged in the vicinity of the orifice of a filling conduit of the tank, in order to generate at least one warning signal when said container is partially filled by the communication conduit after the complete filling of the tank.

According to one embodiment, the electrical contact of the float is in a closed electrical circuit position when said float is not biased, and in an open electrical circuit position as soon as the float is lifted.

As already mentioned, the invention is adapted, in particular, to equip a tank provided with an air intake conduit such as, for example, a fuel oil tank or a boat fuel tank and, in this case, the container is inserted between two portions of said air intake conduit, an upstream portion that is used as a conduit for communicating with the tank, and a downstream portion that is connected to the vent of the container, respectively.

Even more particularly in the case of a boat fuel tank, the downstream portion of the air intake conduit connects the vent of the container to a vent provided in the boat hull.

The invention also provides for a system for indicating when a tank is full, wherein the system comprises a signal and control box and a container connected to the tank. The container comprises a base, a float, an upper portion, and a lower portion. An orifice is arranged at the upper portion of the container. The float comprises an electrical contact connected to the signal and control box. The base of the container is arranged one of above a maximum filling level of the tank and substantially at the same level as the maximum filling level of the tank. A communication conduit is connected to the base of the container and in proximity to an upper portion of the tank. The system generates at least one warning signal when the tank is completely filled and the container is partially filled through the communication conduit.

The signal and control box may be arranged in proximity to an orifice of a filling conduit coupled to the tank. The float may be arranged within the container. The float may be arranged at a lower portion of the container. The electrical contact of the float may close an electrical circuit when the float is not biased and open an electrical circuit as soon as the float is lifted. The float may be movable between a first position wherein the electrical contact of the float closes an electrical circuit to a second position wherein the float opens an electrical circuit. The system may further comprise an air intake conduit. The container may be arranged between the air intake conduit and the communication conduit. The container may be connected to each of the air intake conduit and the communication conduit. The air intake conduit may be connected to the upper portion of the container. The air intake conduit may be connected to the orifice of the container. The system may be adapted to be arranged on a boat. The system may further comprise a vent connected to an air intake conduit, wherein the air intake conduit is connected to the container and the vent is arranged on a hull of the boat. The system may further comprise a vent connected to an air intake conduit, wherein the air intake conduit is connected to the container.

The invention also provides for a system which generates at least one warning signal after a tank is completely filled and when a container is partially filled, wherein the system comprises a signal and control box, a float arranged within the container and comprising an electrical contact connected to the signal and control box, a base portion of the container being arranged one of above a maximum filling level of the tank and substantially at the same level as a maximum filling level of the tank, and a conduit having one end connected to the container and another end connected to the tank, wherein the container is at least partially filled through the conduit after the tank is completely filled.

The float may be movable between a first position wherein the electrical contact of the float closes an electrical circuit to a second position wherein the float opens an electrical circuit. The system may further comprise an air intake conduit. The container may be connected to each of the air intake conduit and the conduit. The system may be adapted to be arranged on a boat. The system may further comprise a vent connected to an air intake conduit, wherein the air intake conduit is connected to the container and the vent is arranged on a hull of the boat.

The invention also provides for a system which generates at least one warning signal when a tank is completely filled and a container, coupled to the tank, is at least partially filled, wherein the system comprises a signal and control box, a float arranged within the container and comprising an electrical contact connected to the signal and control box, a base portion of the container being arranged one of above a maximum filling level of the tank and substantially at the same level as a maximum filling level of the tank, a first conduit having one end connected to the container and another end connected to the tank, and a second conduit having one end connected to the container and another end connected to a vent.

BRIEF DESCRIPTION OF THE DRAWINGS

The invention will be better understood from reading the following description with reference to the attached drawings, wherein.

DETAILED DESCRIPTION OF THE PRESENT INVENTION

Figure 1:
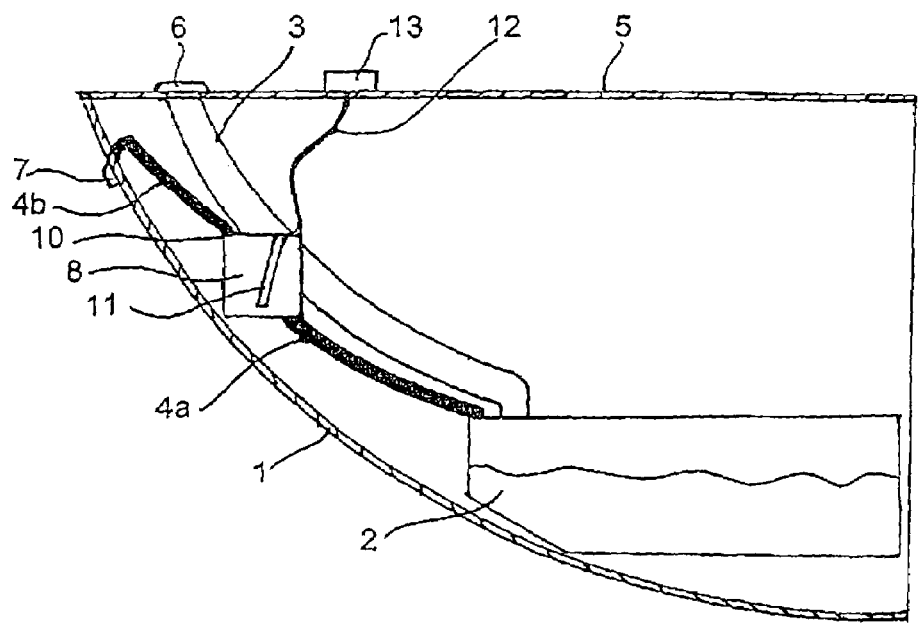
FIG. 1 schematically shows a device according to the invention equipping a boat.

In FIG. 1, one can see a portion of the hull 1 of a boat which is conventionally provided with a fuel tank 2 equipped with a filling conduit 3, and with an air intake conduit that is here made of two parts 4a, 4b for the reasons specified hereinbelow.

As seen clearly in FIG. 1, the filling conduit 3 opens out on the deck 5 of the boat, and it is provided at its end with a tank cap 6.

The air intake conduit 4a, 4b is connected, as it will be specified hereinbelow, to the upper portion of the tank, and opens out to the exterior through a vent 7 provided in the upper portion of the hull 1 of the boat.

The fuel, usually gas oil, is poured into the tank 2 through the filling conduit 3.

In order to fill up the tank with a conventional device that is not equipped according to the invention and in which the air intake conduit is made in one piece, filling is done until the fuel escapes through the vent 7, with all of the drawbacks mentioned hereinabove.

The device according to the invention provides a container 8 that is inserted, as shown in FIG. 1, between the so-called upstream 4a and downstream 4b portions, respectively, of the air intake conduit.

The container 8 is arranged above the tank 2 to which it is connected by said upstream portion 4a that connects the upper portion of said tank 2 to an orifice 9 (FIG. 2) provided in the lower portion of the container 8.

Figure 2:
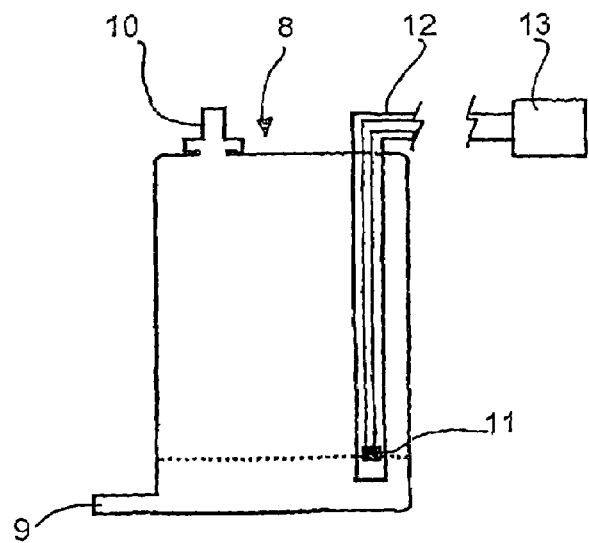
FIG. 2 schematically shows the container of a device according to the invention.

As shown in FIG. 2, the container 8 is further provided at its upper portion with an orifice 10 adapted to receive the downstream portion 4b of the air intake conduit.

Since the portion 4b of the conduit is connected to the vent 7 of the boat, it is understood that for other applications, generally speaking, the orifice 10 of the container could directly constitute a vent, without requiring an intermediary conduit arranged between the elements 7 and 10.

Figure 3:
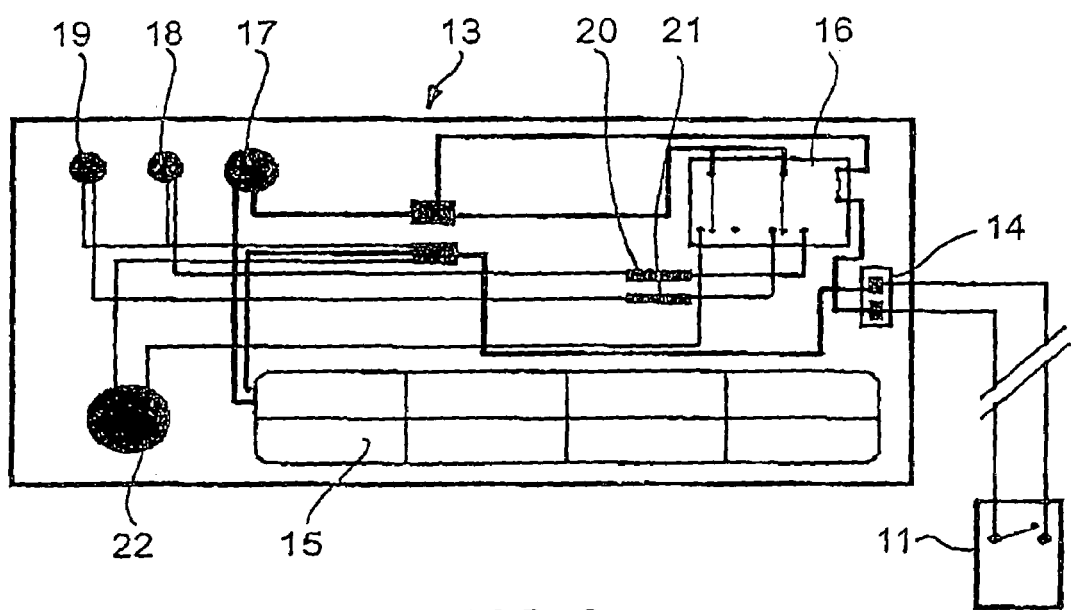
FIG. 3 is an electrical diagram of the signal and control box of the device according to the invention.

The container 8, as shown in FIG. 2, is additionally provided with an electrical contact float 11 that is electrically connected by a cable 12 to a signal and control box 13 that is seen in more detail in FIG. 3, this box being provided to be arranged in proximity to the end of the filling conduit 3 that is closed by the tank cap 6.

It is understood that with such an arrangement, the container 8 begins to fill with gas oil when the tank 2 is already full, and the float 11 is provided to generate a signal when the level reached in said container 8 corresponds, for example, to the line indicated in dotted lines in said FIG. 2.

In the embodiment shown, the non-biased float closes an electrical circuit that opens when said float is lifted, which creates the signal.

As a result, the proper functioning is automatically verified since the electrical circuit is open only when gas oil is present, or when the float is incorrectly positioned (due, for example, to not returning to its initial position).

In FIG. 3, one can see an electrical diagram of the signal and control box 13, this box being therefore connected to the float 11 through a connection 14 that is here connected to a feed battery or batteries 15, on the one hand, and to a relay 16, on the other hand.

The relay 16 is controlled by a breaker switch 17, and it is connected to visual signals 18 and 19 through resistors 20 and 21, respectively, and additionally here to a buzzer 22.

As a result, by acting on the breaker 17, one controls the float 11, and the visual signal 18 lights up (for example, in green).

When the float 11 is biased, i.e., when the tank 2 is full, the gas oil rises in the container 8 through the conduit portion 4a until it causes the float 11 to lift.

As mentioned previously, the lifting of the float 11 causes the opening of its electrical circuit, which then causes the tipping of the relay 16 and, consequently, the lighting of the visual signal 19 (for example, in red), as well as the activating here of the buzzer 22 indicating that the tank 2 is full, while the visual signal 18 turns off.

One then has at least time upon complete filling of the container 8 to stop pouring the gas oil.

In addition to the advantages already mentioned, it is understood that a device according to the invention has an ease of assembly that is quite remarkable and that requires no special adaptation of existing tanks, since it suffices to insert it, as described, into the already existing air intake conduit that connects the tank to the vent in the boat hull.

However, it is also obvious that this application to boat tanks is not the only one. In addition to tanks for boilers, as already mentioned hereinabove, other tanks, such as tanks for trucks or motors, for example, can also be equipped with devices according to the invention.

The invention claimed is:

1. A boat alarm system for indicating when a tank is full, the system comprising:
   a signal and control box;
   a container connected to the tank;
   the container comprising a base, a float, an upper portion, and a lower portion;
   an orifice arranged at the upper portion of the container;
   the float comprising an electrical contact connected to the signal and control box;

the base of the container being arranaed one of above a maximum filling level of the tank and substantially at the same level as the maximum filling level of the tank;

a filling conduit for filling the tank;

a communication conduit connected to the base of the container and in proximity to an upper portion of the tank; and a vent connected to an air intake conduit, wherein the air intake conduit is connected to the container and the vent is arranged on a hull of the boat, wherein the boat alarm system generates at least one warning signal when the tank is completely filled and the container is partially filled through the communication conduit, and wherein the boat alarm system is arranged on a boat and one end of the filling conduit extends to a tank cap arranged on the boat.

2. A boat alarm system which generates at least one warning signal after a boat tank is completely filled and when a container is partially filled, the system comprising:

a signal and control box;

a float arranged within the container and comprising an electrical contact connected to the signal and control box;

a base portion of the container being arranaed one of above a maximum filling level of the boat tank and substantially at the same level as a maximum filling level of the boat tank;

a filling conduit for filling the boat tank;

a conduit having one end connected to the container and another end connected to the boat tank;

the container being at least partially filled through the conduit after the boat tank is completely filled; and a vent connected to an air intake conduit, wherein the air intake conduit is connected to the container and the vent is arranged on a hull of the boat, wherein the boat alarm system is arranged on a boat and one end of the filling conduit extends to a tank cap arranaed on the boat, and wherein the float is movable between a first position wherein the electrical contact of the float closes an electrical circuit to a second position wherein the float opens an electrical circuit.

* * * * *